J. EATON.
ELECTROMAGNETIC SWITCH.
APPLICATION FILED MAY 2, 1916.
1,275,879.
Patented Aug. 13, 1918.
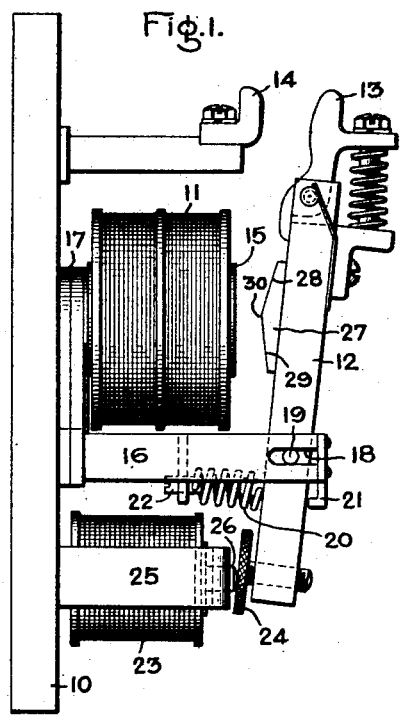
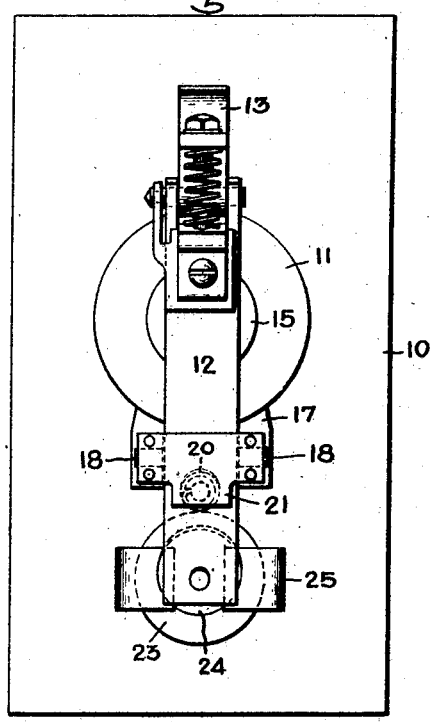
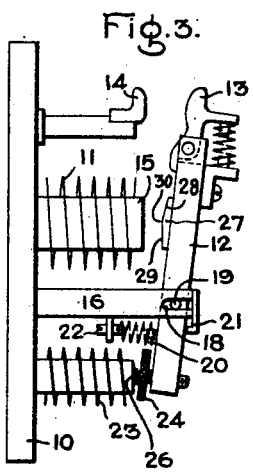
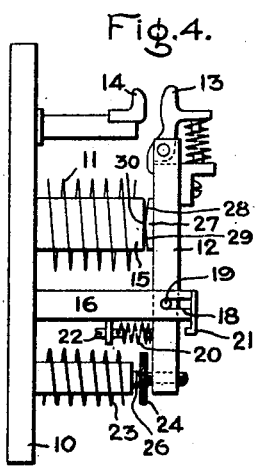
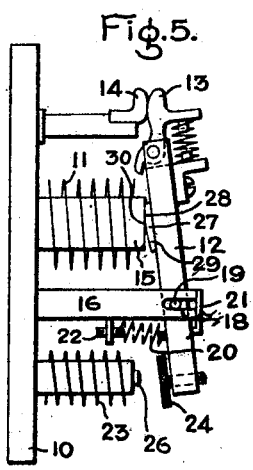
Inventor:
John Eaton,
by Albert G. Davis
His Attorney.

UNITED STATES PATENT OFFICE.

JOHN EATON, OF SCHENECTADY, NEW YORK, ASSIGNOR TO GENERAL ELECTRIC COMPANY, A CORPORATION OF NEW YORK.

ELECTROMAGNETIC SWITCH.

1,275,879.  Specification of Letters Patent.  Patented Aug. 13, 1918.

Application filed May 2, 1916. Serial No. 94,990.

*To all whom it may concern:*

Be it known that I, JOHN EATON, a subject of the King of Great Britain, residing at Schenectady, in the county of Schenectady, State of New York, have invented certain new and useful Improvements in Electromagnetic Switches, of which the following is a specification.

My invention relates to means for controlling the circuits of electric motors and more particularly to improved means whereby an electric motor may be started and automatically brought up to running speed.

In the starting of electric motors, it has been the practice to employ a plurality of electromagnetic switches which close successively to cut out sections of resistance from the motor circuit and bring the motor up to speed. Various means have been devised for controlling the operation of the switches so that they will only close when the current is at a proper value, that is, after a switch has operated to cut out a section of resistance the next switch will not operate until the current has dropped to a safe value due to the speeding up of the motor.

One of the well known methods is to have the resistance switches operated by shunt coils which may be under the control of the operator and the circuit of the shunt coils is controlled by the motor current. A winding in series with the motor commonly called a "throttle" magnet is arranged to close the circuit of the electromagnetic switch or contactor next to operate when the current drops to the proper value. More recently, a switch has gone into general use which has only a single winding in the motor circuit and has the peculiar characteristic that it holds open when the current in the winding is above a predetermined value and closes when the current falls to that value. Such a switch is disclosed in an application filed by Walter O. Lum on Feb. 27, 1911, Serial No. 611,151, and in a modified form is disclosed in an application of Edwin J. Murphy, filed Feb. 15, 1911, Serial No. 608,652, both of these applications being assigned to the same assignee as the present application. This switch is ideal under certain conditions but is not suitable where it is desired to "notch back", that is, to reinsert the resistance step by step. Moreover, in some cases, there is danger of the current dropping to zero temporarily due to reversal of current or "pump back" and the switch would therefore open unless some means such as a shunt coil is provided to hold the switch closed.

A switch of great general utility therefore is one that is closed by a shunt coil under the control of the motor current. One of the best known examples of this general type is the "throttle" arrangemnt above described, but this system is complicated by the necessity for interlocking or auxiliary contacts which are a frequent source of trouble. A form of switch which has frequently been proposed to avoid the necessity of interlocking contacts is one in which a shunt coil closes the switch and a series coil, instead of controlling the circuit of the shunt coil positively prevents the switch from closing by actually holding it open, that is, the shunt coil pulls against the series or "holding out" coil. A switch of this general character is disclosed in patent to Fraser #655,335. The difficulty with the device shown in this patent is that the value of current in the holding-out winding at which the switch will close depends upon the pull of the shunt coil, which of course will vary with the voltage and also with the temperature of the coil. In other words, the "setting" of the switch, *i. e.* the motor current value at which it closes, changes with change of voltage. It also closes at one value of current in the series coil when the shunt coil is cold and another when it is at its operating temperature which is ordinarily about 60 degrees C.

One of the objects of my invention is to improve the electromagnetic switch of the general type just described by temporarily neutralizing the effect of the operating coil and substituting an independent closing force to act against the holding-out coil, the arrangement being such that when the current in the holding out coil drops sufficiently so that the independent closing force overcomes the holding-out force and the switch starts to close, the operating coil again becomes effective to close the switch.

In the accompanying drawing illustrating my invention embodied in concrete form, Figure 1 is a side elevation of an electromagnetic switch embodying my invention; Fig. 2 is a front elevation of the same; Fig. 3 is a diagrammatic view of the switch in its initial position; Fig. 4 is a view of the switch with the switch member moved to an intermediate position, and Fig. 5 shows the switch with the switch member in closed position.

Referring to the drawings, 10 represents an insulating base upon which the switch parts are mounted. An actuating winding for the switch is indicated at 11 and the switch member 12 of magnetic material operated by the magnet winding 11 is provided with a yieldably mounted contact 13 coöperating with a fixed contact 14 mounted upon the base. The magnetic circuit of the winding 11 consists of a pole piece 15 extending through the coil and a parallel magnetic member 16 outside of the magnetic coil and magnetically connected with the pole piece 15 by magnetic member 17 mounted upon the insulating base. The magnetic member 16 forms a support for the switch member 12 and for this purpose has its outer end formed into a yoke in which the switch member fits. The two ends of the yoke are slotted at 18 to form bearings for the trunnions 19 upon which the switch member turns. The spring 20 forces the switch member outward against the stop 21. One end of the spring is adjustably mounted in the magnetic frame 16 while the other end bears against the inner side of the switch member.

On the opposite side of the trunnions and spring from the actuating coil is the holding-out coil 23 coöperating with the end of the switch member so as to hold it against movement when the magnet is sufficiently energized. An armature 24 is adjustably mounted on the end of the switch arm so as to coöperate with the magnetic frame 25 of the holding-out coil 23. As shown the magnetic frame 25 of this holding-out coil is bent around the coil and the outer ends are bent down so that the magnetic circuit may be substantially closed by the armature 24 and an air gap is maintained between the armature and the magnetic frame 25 by providing the non-magnetic stop 26.

The winding 11 acts upon the switch member 12 through the coöperation between the pole piece 15 and the armature portion 27 which is especially arranged to bring about the balancing of the magnetic forces. To this end, the armature 27 is provided with two faces 28 and 29 at an angle with each other so as to form an apex at 30. The face 28 coöperates with the pole piece to close the switch while the face 27 tends to hold it open. When the switch member is moved inward by the energization of the winding 11 so that the apex engages with the pole piece 15, these two faces form equal angles with the pole piece and counteract or neutralize each other, that is the pull on one side of the apex is neutralized by the pull on the other side. If, however, the magnetic balance is disturbed by the switch member rocking about the apex so as to make the closing angle smaller, the holding-out angle becomes greater and the closing force between the pole piece 15 and the magnetic face 28 will predominate to close the switch.

As thus constructed and arranged the operation will be as follows: When the windings are deënergized, the parts will be in the position shown in Figs. 1 and 3. The armature 24 will normally rest against the stop 26 and the spring 20 will force the switch arm 12 outward against the stop 21. If now the two windings are simultaneously energized, or the winding 23 is energized before the winding 11, the switch member will be moved inward by the pull between the pole piece 15 and the armature 27 while the opposite end of the switch arm will be held stationary by the pull of the magnet 23. The parts will now be in the position shown in Fig. 4. In this position the spring 20 has been compressed and the apex 30 of the armature 27 is in contact with the pole piece 15. The magnetic forces set up by the winding 11 acting upon the switch member 12 will theretofore neutralize each other since the pull of the face 28 tending to close the switch is counteracted or offset by the pull of the pole piece 15 and the face 29. The spring 20 tends to disturb this balance since it tends to rock the switch member in a closing direction around the apex 30. The force of this spring which is of course independent of the magnetic forces and is also constant is opposed by the winding 23 so that as the winding 23 remains energized sufficiently to counteract the effect of the spring and prevent the switch member from moving, the parts will remain in the position shown in Fig. 4. If the magnet 23 is deënergized, or if the holding power is weakened sufficiently, the spring will force the lower end of the switch member outward about the apex 30 of the armature 27. As this movement starts, the closing gap begins to narrow while the holding-out gap widens. The closing magnetic force therefore overcomes the holding-out force and the switch member is therefore moved to closed position as shown in Fig. 5 in which the closing face is in contact with the pole piece 15.

It will be noted that with this arrangement, the switch will always close when the pull of the magnet 23 is reduced to the closing point regardless of variations in pull of the magnet 11. In other words, the pull of the magnet 11 in no way affects the initiation of the closing movement. Assume for instance, that the winding 11 is connected across the supply mains and that the winding 23 carries the motor current during the starting of the motor. The switch will close at the same value of current in the winding 23 regardless of changes in voltage impressed on the winding 11. For instance the voltage might drop from 220 to 180 but this would not affect the closing point of the switch since the initiation of the closing movement depends only upon one variable, that is, the current in the winding 23. The magnetic forces acting upon the switch member after it has been moved to an intermediate position are balanced so that more or less pull produced by the winding 11 will have no effect on the switch member.

While I have described my invention as embodied in concrete form and as operating in a specific manner, in accordance with the provisions of the patent statutes, it should be understood that I do not limit my invention thereto since various modifications will suggest themselves to those skilled in the art without departing from the spirit of my invention the scope of which is set forth in the annexed claims.

What I claim as new and desire to secure by Letters Patent of the United States, is:—

1. An electromagnetic switch comprising a switch member, an actuating winding therefor, means whereby upon the energization of said winding the switch member is magnetically balanced with reference to said winding and an independent force set up tending to disturb said balance and cause a magnetic force to prevail and move the switch member to closed position, and an electromagnet for holding the switch member in balanced position.

2. An electromagnetic switch comprising a switch member, an actuating winding therefor, means whereby upon the energization of said winding the switch member is moved to a magnetically balanced position with reference to said winding and an independent force set up tending to disturb said balance and cause a magnetic force to prevail and move the switch member to closed position, and an electromagnet for holding the switch member in balanced position.

3. An electromagnetic switch comprising a switch member, an actuating winding therefor, means whereby upon the energization of said winding the switch member is magnetically balanced with reference to said winding and an independent force applied tending to move it to closed position, and an electromagnet energized by current independent of the current in the actuating winding for holding the switch member in open position when the energizing current is above a predetermined value.

4. An electromagnetic switch comprising a switch member, an actuating winding therefor, means whereby upon the energization of said winding the switch member is moved to a magnetically balanced position with reference to said winding and an independent force applied tending to move it from said position toward closed position and an electromagnet energized by current independent of the current in the actuating winding for holding the switch member in open position when the energizing current is above a predetermined value.

5. An electromagnetic switch comprising a switch member, an actuating winding therefor, means whereby upon the energization of said winding the switch member is moved to a magnetically balanced position with reference to said winding and an independent force set up tending to disturb said balance and cause a magnetic force to prevail and move the switch member to closed position, and an electromagnet for holding the switch member in balanced position against the independent force when the energizing current of the holding winding reaches a predetermined value.

6. An electromagnetic switch comprising a switch member normally in open position, an actuating winding therefor, a holding magnet arranged to hold the switch member in its normal position when energized above a predetermined value and means whereby upon the energization of said windings, the switch member is magnetically balanced with reference to the actuating winding and an independent force set up tending to disturb said balance and cause a magnetic force to prevail and move the switch to closed position, said independent force being opposed by the holding magnet until the current therein drops to a predetermined value.

7. An electromagnetic switch comprising a switch member, an actuating winding for moving the same to closed position, an electromagnet energized by current independent of the current in the actuating winding for holding the switch member against movement to closed position when the energizing current is above a predetermined value, and means whereby upon the energization of the actuating winding its pull upon the switch member is neutralized and a constant force set up to oppose the holding-out magnet until the current in the latter drops to the predetermined value whereupon the actuating coil moves the switch member to closed position.

8. An electromagnetic switch comprising a switch member, an actuating winding for moving the same to closed position, an electromagnet energized by current independent of the current in the actuating winding for holding the switch member against movement when the energizing current is above a predetermined value, and means whereby upon the energization of the actuating winding it acts to neutralize its pull and produce a force independent of the actuating force tending to move the switch member to closed position against the pull of the holding magnet until the current in the latter drops to the predetermined value, whereupon the actuating coil moves the switch member to closed position.

9. An electromagnetic switch comprising a switch member, an actuating winding for moving the same to closed position, an electromagnet energized by current independent of the current in the actuating winding for holding the switch member against movement when the energizing current is above a predetermined value, and means whereby upon the energization of the actuating winding the closing magnetic force set up by the winding is balanced by an equal and opposite force, set up by the winding, and a force independent of the actuating winding is produced tending to move the switch member to closed position against the pull of the holding magnet until the current in the latter drops to a predetermined value and the switch member starts to move away from the holding magnet whereupon the closing force of the actuating winding predominates and moves the switch member to closed position.

10. An electromagnetic switch comprising a switch member, an actuating winding for moving the same to closed position, an electromagnet energized by current independent of the actuating winding for holding one end of the switch member against movement when the energizing current is above a predetermined value, and means whereby upon the energization of the actuating winding the other end of the switch member is moved to an intermediate position in which it is magnetically balanced and a constant force set up to oppose the holding-out winding until the current in the latter drops to a predetermined value whereupon the independent force disturbs the magnetic balance and causes the actuating winding to move the switch member to closed position.

11. An electromagnetic switch comprising an actuating electromagnet, a switch member having two armature portions coöperating with the pole piece of said magnet, one tending to close the switch and the other tending to hold it open and movable upon the energization of the magnet to an intermediate position in which the magnetic pulls upon the two armature portions are equal, means whereby an independent force is set up by the initial movement of the switch member tending to move the switch member out of its balanced position so that the closing force will predominate and an electromagnet opposing the independent force when energized above a predetermined value.

12. An electromagnetic switch comprising an actuating electromagnet, a switch member having an armature arranged in two planes in angular relation to each other and movable into engagement with the pole piece of the magnet to form two equal angular gaps therewith one tending to move the switch member to closed position the other tending to hold it open, means whereby an independent force is set up by the initial movement of the switch member tending to rock the member on the pole piece and decrease the closing gap and an electromagnet for holding the switch member against the independent force.

13. An electromagnetic switch comprising a switch member, an actuating electromagnet for moving the same to closed position, an electromagnet energized by current independent of the current in the actuating winding for holding one end of the switch member against movement when the energizing current is above a predetermined value, an armature for the switch member having two pole faces which engage with the pole piece of the magnet at equal angles before the switch member reaches closed position so as to exert a closing force and a holding-out force which are equal and opposite, and means whereby an independent force is set up by the initial movement of the switch member tending to overpower the holding magnet and force the switch member to rock on the pole piece and close the switch by the magnetic pull between the pole piece and pole face which approaches it.

In witness whereof I have hereunto set my hand this 1st day of May, 1916.

JOHN EATON.